(12) United States Patent
Takahashi

(10) Patent No.: US 9,273,953 B2
(45) Date of Patent: Mar. 1, 2016

(54) APPARATUS FOR INSPECTING WARPAGE OF SHEET-LIKE MEMBER AND METHOD FOR INSPECTING WARPAGE OF SHEET-LIKE MEMBER

(71) Applicant: Nippon Electric Glass Co., Ltd., Shiga (JP)

(72) Inventor: Tadashi Takahashi, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 14/402,462

(22) PCT Filed: Jul. 22, 2013

(86) PCT No.: PCT/JP2013/069743
§ 371 (c)(1),
(2) Date: Nov. 20, 2014

(87) PCT Pub. No.: WO2014/017420
PCT Pub. Date: Jan. 30, 2014

(65) Prior Publication Data
US 2015/0085300 A1   Mar. 26, 2015

(30) Foreign Application Priority Data
Jul. 24, 2012  (JP) .................................. 2012-163734

(51) Int. Cl.
*G01B 11/24*  (2006.01)
*G01B 21/20*  (2006.01)
*G01B 21/30*  (2006.01)
*G01B 11/30*  (2006.01)

(52) U.S. Cl.
CPC .............. *G01B 11/24* (2013.01); *G01B 11/306* (2013.01); *G01B 21/20* (2013.01); *G01B 21/30* (2013.01)

(58) Field of Classification Search
USPC .......................... 356/601–612, 237.1–237.6, 356/239.1–239.8
See application file for complete search history.

(56) References Cited

FOREIGN PATENT DOCUMENTS

| JP | 2003-28632  | 1/2003  |
|----|-------------|---------|
| JP | 2008-70324  | 3/2008  |
| JP | 2008-139268 | 6/2008  |
| JP | 2008-275432 | 11/2008 |

(Continued)

OTHER PUBLICATIONS

International Search Report issued Aug. 13, 2013 in International (PCT) Application No. PCT/JP2013/069743.

(Continued)

*Primary Examiner* — Tri T Ton
(74) *Attorney, Agent, or Firm* — Wenderoth, Lind & Ponack, L.L.P.

(57) ABSTRACT

An apparatus for inspecting warpage of a sheet-like member includes a conveyance device for conveying a glass substrate in a substantially horizontal attitude and a non-contact displacement meter for measuring a distance to a surface of the glass substrate. The apparatus is configured to preset an upper limit waveform and a lower limit waveform based on an ideal waveform of surface shape displacement of the glass substrate in a conveyance direction, which is determined based on a characteristic of the conveyance device; and determine whether or not an actual waveform of the surface shape displacement of the glass substrate in the conveyance direction during conveyance, which is obtained based on the distance measured by the non-contact displacement meter, falls within a range between the upper limit waveform and the lower limit waveform.

5 Claims, 3 Drawing Sheets

(56) References Cited

FOREIGN PATENT DOCUMENTS

| | | |
|---|---|---|
| JP | 2008-286541 | 11/2008 |
| JP | 2011-237243 | 11/2011 |

OTHER PUBLICATIONS

International Preliminary Report on Patentability and Written Opinion of the International Searching Authority issued Jan. 27, 2015 in International (PCT) Application No. PCT/JP2013/069743.

APPARATUS FOR INSPECTING WARPAGE OF SHEET-LIKE MEMBER AND METHOD FOR INSPECTING WARPAGE OF SHEET-LIKE MEMBER

TECHNICAL FIELD

The present invention relates to a method and apparatus for inspecting warpage of a sheet-like member, and more particularly, to a technology for inspecting surface shape displacement of a sheet-like member held in a substantially horizontal attitude.

BACKGROUND ART

As is well known, strict quality requirements against surface shape displacement (warpage) are actually imposed on glass sheets to be used for flat panel displays (hereinafter referred to as "FPDs"), such as a liquid crystal display, a plasma display, a field emission display (including a surface emission display), an electroluminescent display, and an OLED display, and sheet-like members typified by tempered glass to be used for touch panels.

Hitherto, the warpage of the sheet-like member of this type has been generally measured under a state in which the sheet-like member is set stationary. Various methods for measurement in such a stationary state have been proposed or put into practical use.

Specifically, in Patent Literature 1, there is disclosed a configuration in which a member to be measured such as a glass substrate for an FPD is placed and held on a measurement stage (measurement base stone surface plate), and a plurality of air scanners for measuring surface shape displacement of the member to be measured in a non-contact manner are provided at predetermined intervals. The configuration includes a drive mechanism for moving the air scanners in directions of the X and Y axes.

Further, in Patent Literature 2, there is disclosed a configuration including holding means for holding, for a predetermined period of time, a sheet-like member stopped at a predetermined position of a roller conveyor for conveying the sheet-like member, a frame arranged below the sheet-like member at the predetermined position and is capable of ascending and descending, and height measurement means such as dial gauges, which are arranged on the frame to measure height positions of the sheet-like member at a plurality of points.

CITATION LIST

Patent Literature 1: JP 2008-139268 A
Patent Literature 2: JP 2003-28632 A

SUMMARY OF INVENTION

Technical Problem

However, in the above-mentioned method disclosed in Patent Literature 1, the surface shape displacement of the member to be measured is required to be measured by the plurality of air scanners under a state in which the member to be measured is placed on the measurement stage one by one. Therefore, the operation of placing the member to be measured on the measurement stage one by one is extremely complicated and troublesome, and a separate apparatus for performing the placing operation is required, which may cause complication of the apparatus. In addition, when this method is employed to measure all of the members to be measured such as glass sheets after production, a wasted time may be caused during measurement, which leads to significant reduction in production efficiency.

Further, in the above-mentioned method disclosed in Patent Literature 2, the surface shape displacement of the sheet-like member can be measured only after the sheet-like member during conveyance is stopped at the predetermined position and the dial gauges and the like are raised by the frame. Therefore, a mechanism or the like for raising the frame at a predetermined timing is necessary, which necessitates the complication of the apparatus. In addition, similarly to the above, also when such a method is employed to measure all of the members to be measured such as glass sheets after production, a wasted time may be required for measurement, which leads to significant reduction in production efficiency.

The present invention has been made in view of the above-mentioned circumstances, and it is therefore a technical object thereof to simplify the apparatus necessary for measurement of the surface shape displacement when the warpage of the sheet-like member is inspected and to reduce the time required for the measurement, to thereby significantly improve the production efficiency.

Solution to Problem

According to one embodiment of the present invention, which is devised to solve the above-mentioned problems, there is provided an apparatus for inspecting warpage of a sheet-like member, the apparatus comprising: a conveyance device for conveying the sheet-like member in a substantially horizontal attitude; and a non-contact displacement meter for measuring a distance to a surface of the sheet-like member, wherein the apparatus is configured to: preset an upper limit waveform and a lower limit waveform based on an ideal waveform of surface shape displacement of the sheet-like member in a conveyance direction, which is determined based on a characteristic of the conveyance device; and determine whether or not an actual waveform of the surface shape displacement of the sheet-like member in the conveyance direction during conveyance, which is obtained based on the distance measured by the non-contact displacement meter, falls within a range between the upper limit waveform and the lower limit waveform. In this case, the above-mentioned "substantially horizontal attitude" comprises an attitude inclined by, for example, within 10° with respect to a horizontal plane as well as an attitude completely following the horizontal plane (the same applies hereinafter). Further, the above-mentioned "waveform" is not limited to a waveform formed of continuous curved lines, but also comprises a waveform formed of an aggregate of plotted points (the same applies hereinafter).

With such a configuration, when the sheet-like member is conveyed by the conveyance device, the non-contact displacement meter measures the surface shape displacement of the sheet-like member, and hence it is unnecessary to place the sheet-like member on a surface plate, or stop the sheet-like member in the course of conveyance and cause the displacement meter to ascend or descend. With this, the apparatus necessary for measuring the surface shape displacement of the sheet-like member is simplified, and the time required for the measurement is reduced to eliminate wasted time. Thus, the production efficiency may be significantly improved. In addition, the upper limit waveform and the lower limit waveform used for determining whether or not the surface shape displacement of the sheet-like member is proper are set based on the ideal waveform of the surface shape displacement of the sheet-like member, which is determined based on the characteristic of the conveyance device. Therefore, measurement of the surface shape displacement of the sheet-like member and determination of whether or not the surface shape displacement of the sheet-like member is proper are performed considering the characteristic of the conveyance device. Specifically, while the sheet-like member is conveyed, the sheet-like member is deformed depending on the relationship of the components of the conveyance device and the weight of the sheet-like member or the like. Considering the deformation of the sheet-like member due to such a characteristic of the conveyance device, the ideal waveform and also the upper limit waveform and the lower limit waveform of the surface shape displacement of the sheet-like member are determined, and based on those waveforms, the measurement of the surface shape displacement of the sheet-like member and the determination of whether or not the surface shape displacement of the sheet-like member is proper are performed. Therefore, under a state in which the deformation of the sheet-like member during conveyance due to the characteristic of the conveyance device is substantially neglected, the above-mentioned measurement and determination of properness are performed, and hence the accuracy of the measurement and determination can be appropriately secured.

In such a configuration, it is preferred that the conveyance device comprise: feeding means for feeding the sheet-like member in the conveyance direction, the feeding means being arranged at least at both end portions in a direction orthogonal to the conveyance direction of the sheet-like member; and fluid floatation means for causing the sheet-like member to float in a non-contact manner, the fluid floatation means being arranged between the feeding means.

With such a configuration, while the sheet-like member is fed by the feeding means, the surface shape displacement of the sheet-like member can be measured by the fluid floatation means in a stable state. That is, while the feeding means feeds the sheet-like member, the fluid floatation means causes the sheet-like member to float. Thus, a high-quality sheet-like member can be maintained without being flawed or the like, and a random deformation hardly occurs in the sheet-like member during conveyance. In this manner, the measurement and the determination of properness are possible with high accuracy. Then, the upper limit waveform and the lower limit waveform are set based on the characteristics of the feeding means and the fluid floatation means, and hence, as described above, the measurement of the surface shape displacement of the sheet-like member and the determination of whether or not the surface shape displacement of the sheet-like member is proper are accurately performed.

In the configuration described above, it is preferred that the ideal waveform be determined by measuring, while conveying a sheet-like member having a surface that is an ideal plane or a plane equivalent thereto by the conveyance device, a distance to the surface of the sheet-like member by the non-contact displacement meter.

With such a configuration, the ideal waveform is obtained as a waveform that is curved or the like due to the characteristic of the conveyance device with regard to the sheet-like member having a surface that is originally an ideal plane or a plane equivalent thereto. Therefore, the upper limit waveform and the lower limit waveform set based on this ideal waveform are extremely preferred for performing determination of whether or not the sheet-like member is proper. Note that, the above-mentioned selection of the sheet-like member having a surface that is an ideal plane or a plane equivalent thereto is performed by placing the sheet-like member on a precision surface plate or the like, measuring flatness of the sheet-like member by a dedicated sensor or the like, and finding the sheet-like member having the best flatness as a result (sheet-like member that has no warpage or only an extremely small warpage in a level that does not cause a problem).

In the configuration described above, it is preferred that the non-contact displacement meter comprise a plurality of non-contact displacement meters arranged in a direction orthogonal to the conveyance direction of the sheet-like member, that the ideal waveforms be predetermined so as to respectively correspond to positions of the plurality of non-contact displacement meters, and that the upper limit waveforms and the lower limit waveforms be respectively preset based on the ideal waveforms.

With such a configuration, the upper limit waveform and the lower limit waveform based on the ideal waveform are preset for each of the plurality of the displacement meters arranged along the direction orthogonal to the conveyance direction of the sheet-like member (width direction of the sheet-like member), and hence the surface shape displacement of the sheet-like member is measured by the respective displacement meters at a plurality of positions in the width direction of the sheet-like member. With this, the surface shape displacement is measured across a wide range of the sheet-like member, and hence the measurement accuracy thereof is further increased.

In the configuration described above, it is preferred that the non-contact displacement meter be fixedly installed above a conveyance path of the sheet-like member.

With such a configuration, it is unnecessary to separately comprise a mechanism for moving the displacement meters, and the above-mentioned predetermined measurement is performed only by conveying the sheet-like member. Therefore, the simplification of the apparatus is further promoted.

In the configuration described above, it is preferred that the sheet-like member be determined to be non-defective when the actual waveform falls within the range between the upper limit waveform and the lower limit waveform, and be determined to be defective otherwise.

With such a configuration, the determination of whether the sheet-like member is non-defective or defective is performed accurately and precisely, and hence a high-performance apparatus for inspecting warpage of a sheet-like member is realized.

Further, according to one embodiment of the present invention, which is devised to solve the above-mentioned problems, there is provided a method of inspecting warpage of a sheet-like member with use of a conveyance device for conveying the sheet-like member in a substantially horizontal attitude and a non-contact displacement meter for measuring a distance to a surface of the sheet-like member, the method comprising: precreating an ideal waveform of surface shape displacement of the sheet-like member in a conveyance direction, which is determined based on a characteristic of the conveyance device, and presetting an upper limit waveform and a lower limit waveform based on the ideal waveform; and determining whether or not an actual waveform of the surface shape displacement of the sheet-like member in the conveyance direction during conveyance, which is obtained based on the distance measured by the non-contact displacement meter, falls within a range between the upper limit waveform and the lower limit waveform.

This method is substantially the same as the apparatus according to one embodiment of the present invention whose components have been described above, and hence has substantially similar actions and effects to those of the apparatus.

Advantageous Effects of Invention

As described above, according to one embodiment of the present invention, the apparatus necessary for measuring the surface shape displacement when the warpage of the sheet-like member is inspected may be simplified and time required for the measurement may be reduced, to thereby significantly improve the production efficiency. In addition, the measurement of the surface shape displacement of the sheet-like member and the determination of whether or not the surface shape displacement of the sheet-like member is proper are performed considering the characteristic of the conveyance device. Therefore, under a state in which the deformation of the sheet-like member during conveyance due to the conveyance device is substantially neglected, the above-mentioned measurement and determination of properness can be performed, and hence the accuracy of the measurement and determination can be appropriately secured.

BRIEF DESCRIPTION OF DRAWINGS

FIG. 2 is a perspective view illustrating the schematic configuration of the main part of the apparatus for inspecting warpage of a sheet-like member according to the embodiment of the present invention.

DESCRIPTION OF EMBODIMENT

Now, an apparatus for inspecting warpage of a sheet-like member (hereinafter simply referred to as "inspection apparatus") according to an embodiment of the present invention is described with reference to the drawings. Note that, in this embodiment, the inspection apparatus is described assuming a case where, as the sheet-like member, a glass substrate for an FPD, in particular, a glass substrate for a liquid crystal display is used.

Figure 1:
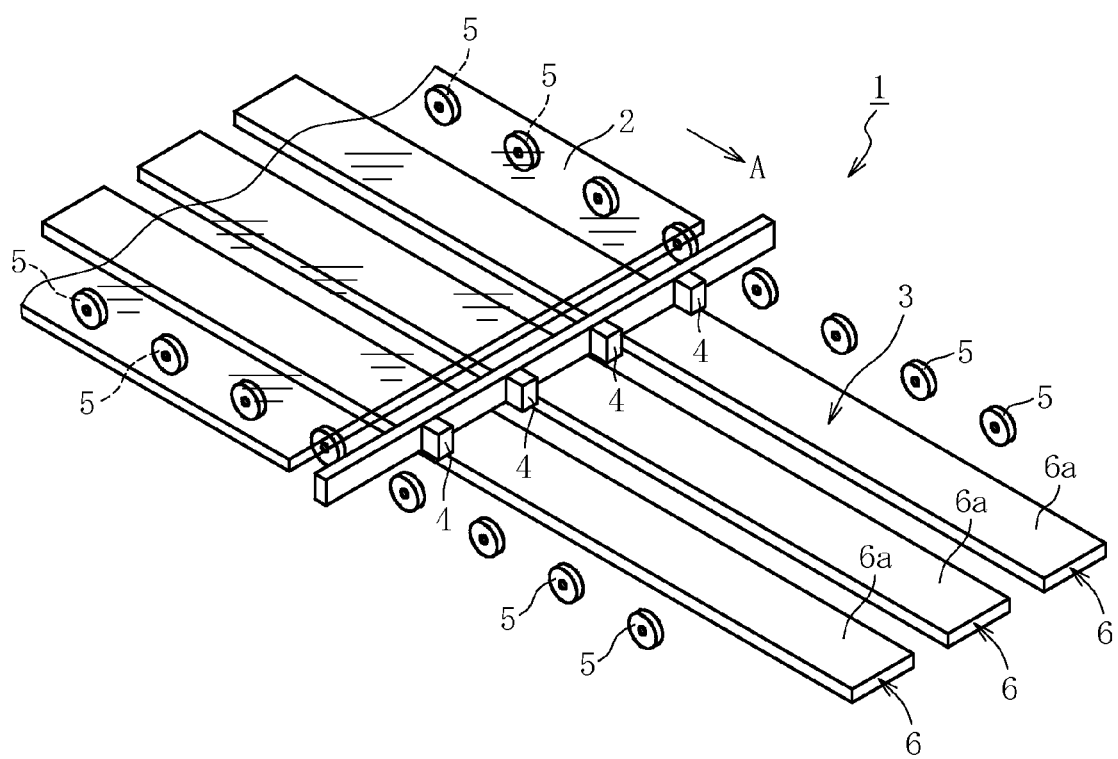
FIG. 1 is a perspective view illustrating a schematic configuration of a main part of an apparatus for inspecting warpage of a sheet-like member according to an embodiment of the present invention.

FIG. 1 illustrates a schematic configuration of an inspection apparatus 1 according to the embodiment of the present invention. As illustrated in FIG. 1, the inspection apparatus 1 comprises a conveyance device 3 for conveying a glass substrate 2 in an arrow A direction, and a plurality of (four in FIG. 1) laser displacement meters 4 installed so as to be distanced from each other above a conveyance path of the glass substrate 2 and arranged along a direction orthogonal to the conveyance direction A of the glass substrate 2 (hereinafter referred to as "width direction").

Those laser displacement meters 4 are each configured to measure a distance to the surface of the glass substrate 2, and are each fixedly installed at a certain position so as to be oriented in a direction orthogonal to the surface of the glass substrate 2. There are laser displacement meters 4 employing a diffusion system and a regular reflection system, but considering that the glass substrate 2 is a transparent member, it is preferred to use a laser displacement meter employing the regular reflection system. Note that, instead of the laser displacement meter 4, it is possible to use a non-contact displacement meter (displacement sensor) that uses light, ultrasonic waves, or the like as a medium. Further, the glass substrate 2 inspected by the inspection apparatus 1 has a dimension in the conveyance direction A of from 300 mm to 3,500 mm, a dimension in the width direction of from 300 mm to 3,500 mm, and a sheet thickness of from 0.1 mm to 1.1 mm.

The conveyance device 3 comprises a plurality of conveyance rollers 5 serving as feeding means for supporting both widthwise end portions of the glass substrate 2 from below and feeding the glass substrate 2, and air floatation units 6 serving as fluid floatation means installed in a widthwise center region between the conveyance rollers 5 arranged in two rows.

In this case, no laser displacement meter 4 is present above the conveyance rollers 5 arranged in two rows. This configuration is adopted because the conveyance rollers 5 are slightly decentered, and it is required to avoid the waveform of the glass substrate 2 in the conveyance direction A from being affected by the decentering.

Further, the air floatation units 6 are each configured to blow air upwardly from a large number of through holes (not shown) formed across the entire region of an upper surface portion 6a of a box member made of a metal or a resin. As an air source, it is preferred to use a blower provided with an HEPA filter, or a CDA. In this case, as the fluid floatation means, instead of the air floatation units 6, it is possible to use means having a form to blow inert gas or liquid such as water upwardly.

Note that, there is an air floatation unit 6 having a special form, which corrects the surface of the glass substrate 2 to be planar by applying negative pressure to the surface of the glass substrate 2 at the same time of blowing air to the surface of the glass substrate 2, but the air floatation unit 6 of this form is not used in the present invention. That is, in the present invention, the air floatation unit 6 that causes the glass substrate 2 to float by blowing air without using negative pressure is used.

Figure 3:
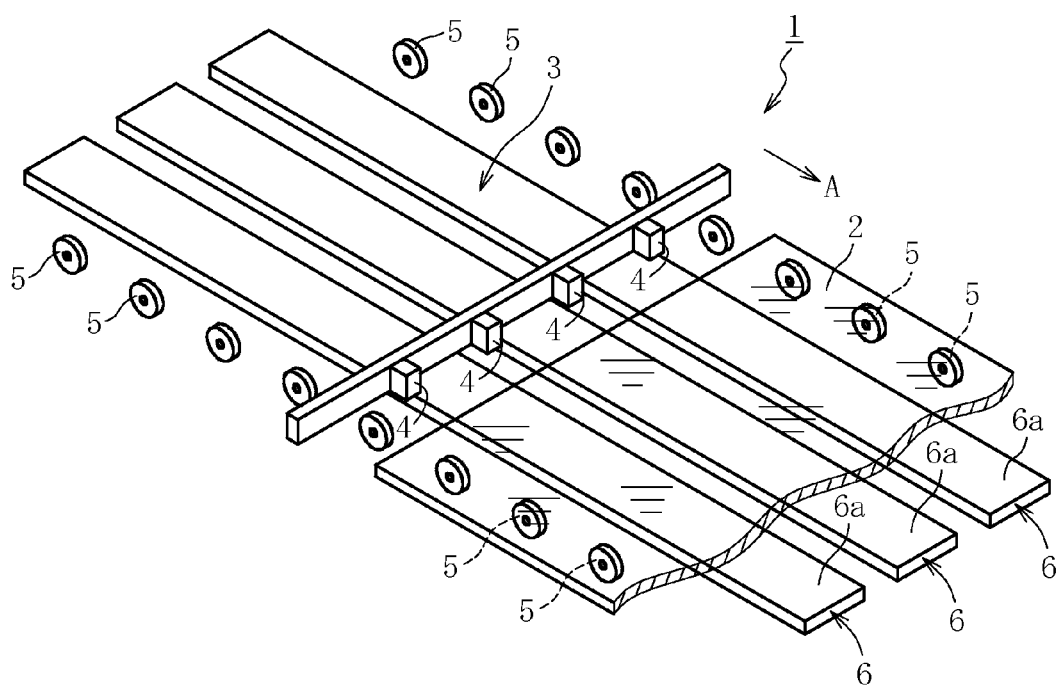
FIG. 3 is a perspective view illustrating the schematic configuration of the main part of the apparatus for inspecting warpage of a sheet-like member according to the embodiment of the present invention.

FIG. 1 illustrates a state at a time point at which the laser displacement meters 4 start measurement of distances to the surface of one of the glass substrates 2 that are sequentially conveyed from the upstream side. Further, FIG. 2 illustrates a state in which the laser displacement meters 4 successively measure the distances to the surface while the one glass substrate 2 is conveyed. Further, FIG. 3 illustrates a state at a time point at which the laser displacement meters 4 end the measurement for the one glass substrate 2. Then, the glass substrates 2 that are sequentially conveyed from the upstream side are subjected to measurement by the laser displacement meters 4 without being stopped.

During the measurement by the laser displacement meters 4, the glass substrate 2 receives air pressure from the air floatation units 6 while being fed by the conveyance rollers 5, and hence the glass substrate 2 is deformed. All of the glass substrates 2 sequentially conveyed from the upstream side are fed and receive air pressure in the same condition.

In view of this, first, the highest-quality glass substrate 2 whose surface has an ideal plane or a plane equivalent thereto is selected, and while the glass substrate 2 is conveyed, the laser displacement meters 4 successively measure the distances to the surface of the glass substrate 2. Then, with this measurement, the distances from the laser displacement meters 4 to the surface of the glass substrate 2 are successively collected in the conveyance direction A of the glass substrate 2, and based on the collected data, an ideal waveform X0 of the surface shape of the glass substrate 2 in the conveyance direction A is obtained as shown in FIG. 4.

That is, the ideal waveform X0 is an ideal waveform of the surface shape displacement of the glass substrate 2 in the conveyance direction A, which is determined based on the characteristic of the conveyance device 3 comprising the conveyance rollers 5 and the air floatation units 6. Note that, the above-mentioned selection of the highest-quality glass substrate 2 is performed by sequentially placing the glass substrates on the precision surface plate or the like, measuring flatness of the surface of each of those glass substrates, and finding the glass substrate having a surface characteristic that is thought to be the best, thereby selecting this glass substrate as the highest-quality glass substrate.

Figure 4:
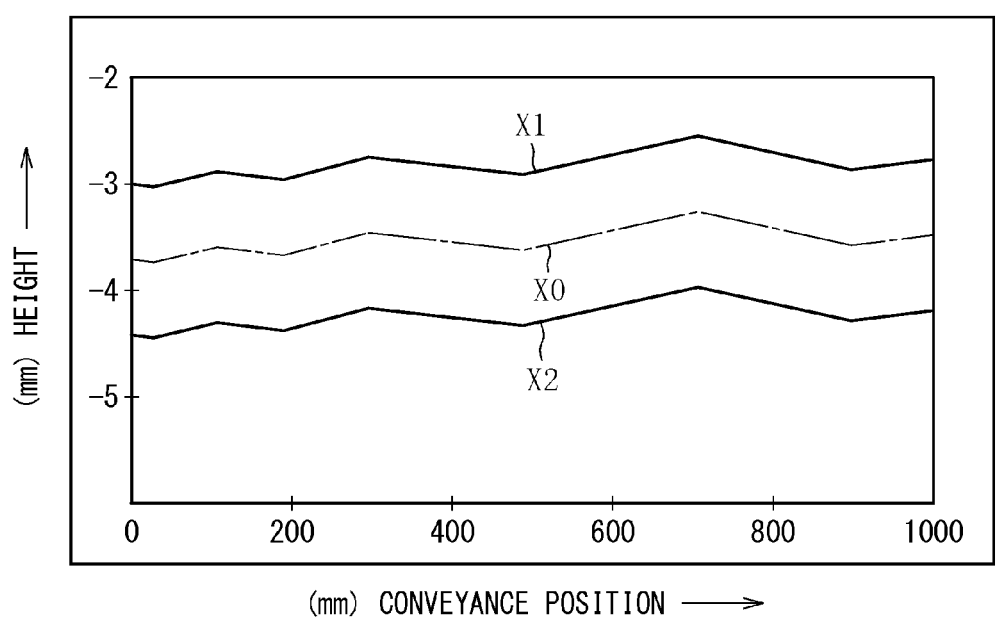
FIG. 4 is a schematic graph showing an ideal waveform, an upper limit waveform, and a lower limit waveform in the apparatus for inspecting warpage of a sheet-like member according to the embodiment of the present invention.

Then, in FIG. 4, the above-mentioned ideal waveform X0 is translated upward and downward to set an upper limit waveform X1 and a lower limit waveform X2. The upper limit waveform X1 and the lower limit waveform X2 are found through repetitive experiment or the like in view of the relation to the ideal waveform X0 so that, if the surface shape displacement falls within the range between both the waveforms X1 and X2, the glass substrate 2 has surface shape displacement in a level that does not cause a problem during film formation or the like. Note that, in FIG. 4, the vertical axis represents a height in a case where the position of the laser displacement meter 4 is assumed as 0, and the lateral axis represents a position of the glass substrate 2 in the conveyance direction A. A plurality of upper limit waveforms X1 and a plurality of lower limit waveforms X2, which are each based on the ideal waveform X0 as described above, are set so as to correspond to the plurality of laser displacement meters 4.

After the upper limit waveform X1 and the lower limit waveform X2 of the surface shape displacement of the glass substrate 2 are set as described above, the glass substrates 2 that are sequentially conveyed from the upstream side by the conveyance device 3 are subjected to successive collection of the distances to the surface of the glass substrate 2 by the laser displacement meters 4 one by one as from the state illustrated in FIG. 1 via the state illustrated in FIG. 2 to the state illustrated in FIG. 3.

Figure 5:
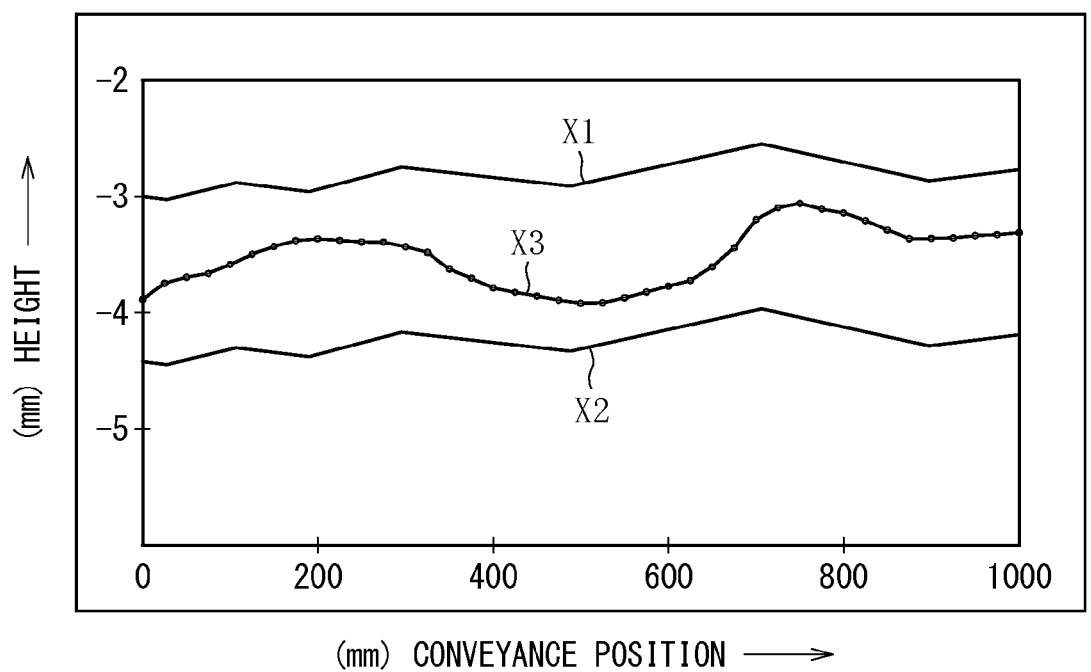
FIG. 5 is a schematic graph showing the upper limit waveform, the lower limit waveform, and an actual waveform in the apparatus for inspecting warpage of a sheet-like member according to the embodiment of the present invention.

In this manner, as shown in FIG. 5, when an actual waveform X3 of the surface shape displacement of the glass substrate 2 in the conveyance direction A during conveyance falls within the range between the upper limit waveform X1 and the lower limit waveform X2, the glass substrate 2 is determined to be non-defective. In this case, the plurality of upper limit waveforms X1 and the plurality of lower limit waveforms X2 are set so as to correspond to the plurality of laser displacement meters 4, and a plurality of actual waveforms X3 are similarly obtained. Therefore, when all of the actual waveforms X3 fall within all of the corresponding ranges between the upper limit waveforms X1 and the lower limit waveforms X2, the glass substrate 2 is determined to be non-defective.

Figure 6:
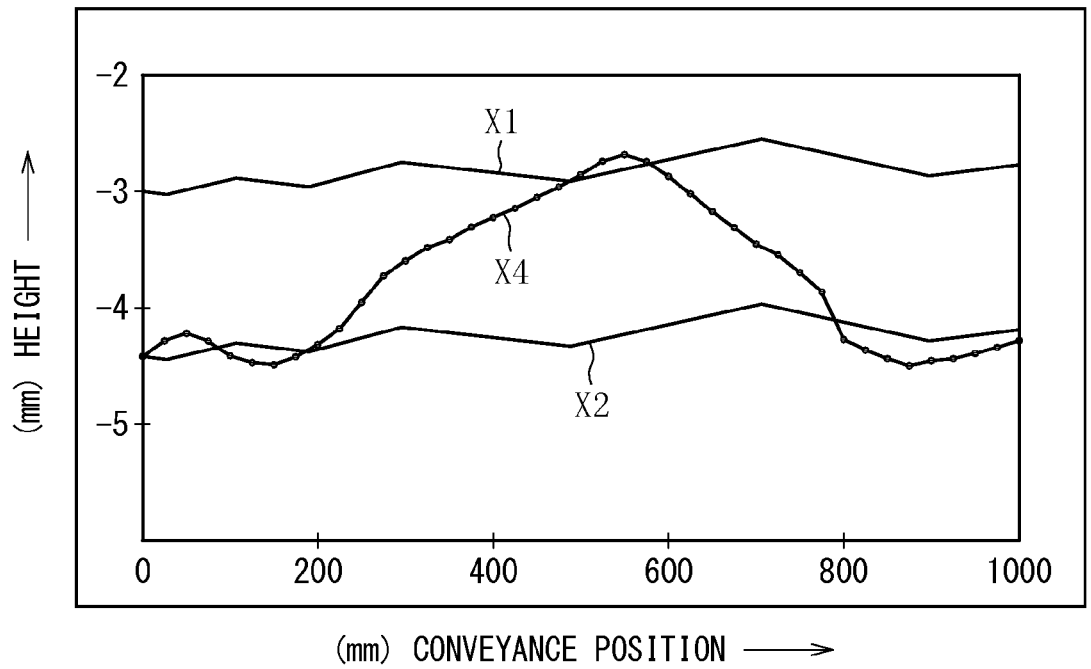
FIG. 6 is a schematic graph showing the upper limit waveform, the lower limit waveform, and the actual waveform in the apparatus for inspecting warpage of a sheet-like member according to the embodiment of the present invention.

On the other hand, as shown in FIG. 6, when an actual waveform X4 of the surface shape displacement of the glass substrate 2 in the conveyance direction A during conveyance is outside the range between the upper limit waveform X1 and the lower limit waveform X2 (although, in FIG. 6, the surface shape displacement exceeds and falls below both of the upper limit waveform X1 and the lower limit waveform X2, a case where the surface shape displacement exceeds or falls below any one of the waveforms is included), the glass substrate 2 is determined to be defective. In this case, even when any one of the plurality of obtained actual waveforms X4 is outside the corresponding range between the upper limit waveform X1 and the lower limit waveform X2, the glass substrate 2 is determined to be defective.

Note that, in the above-mentioned configuration, it is preferred to separately provide a sensor for detecting the start and end of measurement for obtaining the actual waveform X3 or X4, but the signal of the laser displacement meter 4 may be used instead. Further, the actual waveforms X3, X4 may be acquired by the plurality of laser displacement meters 4 via a sequencer device or directly by a computer, but in order to acquire data from the plurality of laser displacement meters 4 synchronously without time delay, it is preferred to acquire data via a data recorder device.

In this case, the start end and the terminal end of the obtained actual waveform X3 or X4 may contain invalid data due to the displacement of the measurement position of the laser displacement meter 4, due to the end surface of the glass substrate 2 in the conveyance direction A, due to the air floatation unit 6, and the like. In view of this, it is preferred that a preset range or number of data be deleted, or the rising or falling of the actual waveform be automatically deleted by a computer or the like for elimination.

Note that, in the above-mentioned embodiment, the feeding means is constructed of the plurality of conveyance rollers 5, but instead, the feeding means may be constructed of a conveyance belt or the like. Further, in the above-mentioned embodiment, the glass substrate 2 for an FPD (in particular, glass substrate for a liquid crystal display) is subjected to measurement, but a sheet-like member such as a glass sheet or a tempered glass sheet that is used for other applications may be subjected to measurement.

REFERENCE SIGNS LIST 1 apparatus for inspecting warpage of sheet-like member
2 glass substrate (sheet-like member)
3 conveyance device
4 laser displacement meter (non-contact displacement meter)
5 conveyance roller (feeding means)
6 air floatation unit (fluid floatation unit)
X0 ideal waveform
X1 upper limit waveform
X2 lower limit waveform
X3 actual waveform
X4 actual waveform

The invention claimed is:
1. An apparatus for inspecting warpage of a sheet member, the apparatus comprising:
   a computer;
   a conveyance device for conveying the sheet member in a substantially horizontal attitude; and
   a non-contact displacement meter for measuring a distance to a surface of the sheet member,
   wherein the computer is configured to:
      while conveying an ideal sheet member having a surface that is an ideal plane or a plane equivalent thereto by the conveyance device, by measuring a distance to the surface of the ideal sheet member by the non-contact displacement meter, prepare an ideal waveform being a curved line representing gradual changes in a height position of the surface of the ideal sheet member in a conveyance direction;

prepare an upper limit waveform and a lower limit waveform by translating the ideal waveform upward and downward;

while conveying an inspection-target sheet member, by measuring a distance to a surface of the inspection-target sheet member by the non-contact displacement meter, obtain an actual waveform being a curved line representing gradual changes in a height position of the surface of the inspection-target sheet member in the conveyance direction; and determine the inspection-target sheet member to be non-defective when the actual waveform falls within a range between the upper limit waveform and the lower limit waveform, and determine the inspection-target sheet member to be defective otherwise.

2. The apparatus for inspecting warpage of a sheet member according to claim 1, wherein the conveyance device comprises:

feeding means for feeding the sheet member in the conveyance direction, the feeding means being arranged at least at both end portions in a direction orthogonal to the conveyance direction of the sheet member; and fluid floatation means for causing the sheet member to float in a non-contact manner, the fluid floatation means being arranged between the feeding means.

3. The apparatus for inspecting warpage of a sheet member according to claim 1, wherein the non-contact displacement meter comprises a plurality of non-contact displacement meters arranged in a direction orthogonal to the conveyance direction of the sheet member, wherein the ideal waveform is a plurality of ideal waveforms prepared in correspondence to positions of the plurality of non-contact displacement meters, and wherein the upper limit waveform is a plurality of upper limit waveforms and the lower limit waveform is a plurality of lower limit waveforms respectively prepared based on the ideal waveforms.

4. The apparatus for inspecting warpage of a sheet member according to claim 1, wherein the non-contact displacement meter is fixedly installed above a conveyance path of the sheet member.

5. A method of inspecting warpage of a sheet member with use of a conveyance device for conveying the sheet member in a substantially horizontal attitude and a non-contact displacement meter for measuring a distance to a surface of the sheet member, the method comprising:

while conveying an ideal sheet member having a surface that is an ideal plane or a plane equivalent thereto by the conveyance device, by measuring a distance to the surface of the ideal sheet member by the non-contact displacement meter, preparing with a computer an ideal waveform being a curved line representing gradual changes in a height position of the surface of the ideal sheet member in a conveyance direction;

preparing with the computer an upper limit waveform and a lower limit waveform by translating the ideal waveform upward and downward;

while conveying an inspection-target sheet member, by measuring a distance to a surface of the inspection-target sheet member by the non-contact displacement meter, obtaining with the computer an actual waveform being a curved line representing gradual changes in a height position of the surface of the inspection-target sheet member in the conveyance direction; and determining with the computer the inspection-target sheet member to be non-defective when the actual waveform falls within a range between the upper limit waveform and the lower limit waveform, and determining with the computer than the inspection-target sheet member to be defective otherwise.

* * * * *